Dec. 11, 1956 W. FACKERT 2,773,743
RECOVERY OF SULFURIC ACID AND IRON OXIDE FROM IRON SULFATE
Filed Sept. 17, 1953
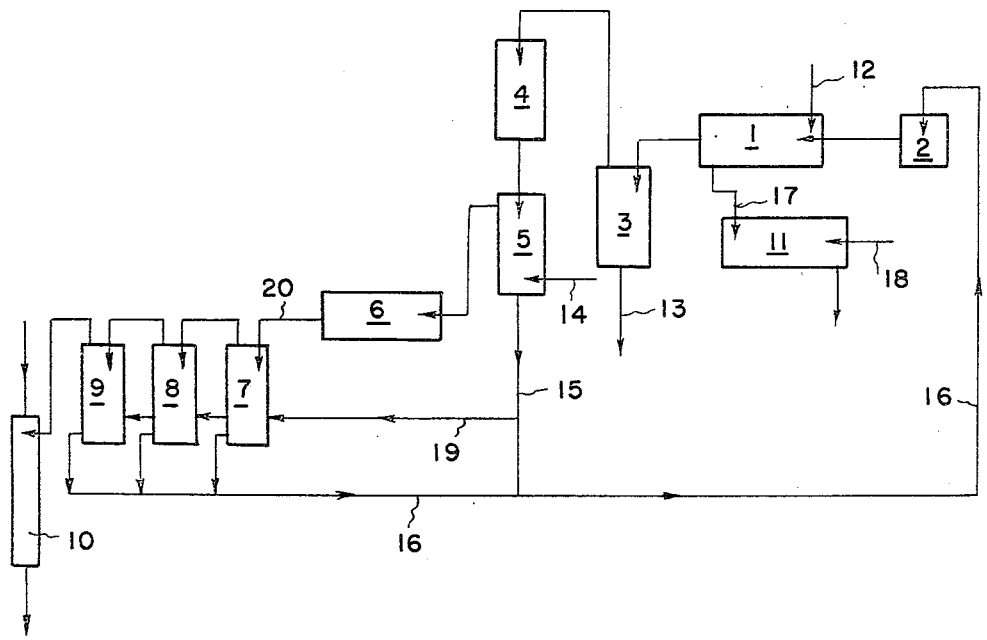
INVENTOR
WALTER FACKERT
BY
*Henderoth, Lind & Ponack*
ATTORNEYS

United States Patent Office 2,773,743
Patented Dec. 11, 1956

2,773,743

RECOVERY OF SULFURIC ACID AND IRON OXIDE FROM IRON SULFATE

Walter Fackert, Neuwied, Germany

Application September 17, 1953, Serial No. 380,818

Claims priority, application Germany September 17, 1952

6 Claims. (Cl. 23—200)

The present invention relates to improvements in the recovery of sulfuric acid and iron oxide from iron sulfate, more particularly in the working up of waste pickling acid.

Scale is removed from heat treated iron surfaces by the use, preferably, of acid solutions, especially sulfuric acid solutions. Sulfuric acid baths which contain up to about 25% by weight of free acid are employed.

In the long-employed paddle pickling process, the initial content is such that, upon increase of the iron content to the upper limit, there is a maximum consumption of acid. The solution is then renewed. Recent pickling plants, as for example the conveyor belt pickling plant, operate—in order to obtain uniform pickling—with high acid contents (20–25% by weight) which are kept as uniform as possible. This mode of operation makes possible a continuous working up of the pickling acid, it being necessary continuously to adjust the acid content by replacement of the consumed quantities of acid and to adjust the iron content by the removal of iron salts which are produced.

The consumed sulfuric acid, apart from losses due to entrainment from the system, is almost entirely contained in the resulting iron sulfate. The latter also contains the iron lost by the material being pickled. It is thus a desideratum to recover industrial values—by recovering the sulfuric acid and the iron—from the waste acids which are available in large quantities. In this connection, it is of decisive significance that no process has hitherto become known whereby, by neutralization, these waste acids can be rendered so harmless that the resultant reaction products do not give rise to any prejudicial after-effect. An advantageous solution of the problem of working up the waste acid will thus also constitute a perfect way of disposing of the waste acids.

The separation of the iron sulfate from used waste pickling acids can be realized in various, per se conventional, ways. For instance, the iron-II-sulfate can be precipitated as heptahydrate or as monohydrate by cooling the waste acids to room temperature (about 20° C.) or lower or by increasing the acid content as a result of removal of water with or without simultaneous addition of acid.

In order to split the so-precipitated iron sulfate for the recovery of sulfuric acid and iron oxide, the iron sulfate has heretofore been heated with free access to air (roasted). In such process, sulfuric acid is not directly obtained, but gaseous admixtures of $SO_2$ and $SO_3$ from which it is then necessary, by various reactions, to obtain sulfuric acid. In a modification of this process, it has been recommended to add carbon in the form of granules of different sizes to the material being roasted.

The disadvantages of these processes is that the sulfuric acid is produced only through a mixture of gases, the maintenance in this mixture of the correct amounts of the active components, $SO_2$ and $SO_3$, giving rise to great difficulties. Moreover, the iron oxide which remains as residue is of such low purity that it can be used practically only as blast-furance raw material.

It is an object of the present invention to embody a process which is free of the aforesaid defects. It is a further object of this invention to embody a process of the type in question which leads directly to sulfuric acid and to extremely pure iron oxide, having for example a sulfur content below 0.02% by weight.

These objects are achieved, briefly stated, by bringing the iron sulfate into contact with steam at a temperature above 600° C. in an air-free or substantially air-free chamber. Absorbable sulfuric acid and iron oxide of maximum purity are directly produced.

Essentially, two reactions may be involved, as shown by the following equations:

$$FeSO_4 + H_2O = FeO + H_2SO_4 \quad (1)$$
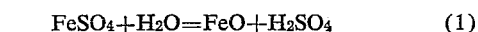
$$2FeSO_4 + H_2O = Fe_2O_3 + SO_2 + H_2SO_4 \quad (2)$$
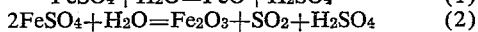

The magnitude of the reaction temperature employed is of decisive influence on the process. A splitting action of the steam on the heated iron sulfate begins at temperatures of about 600° C. Whether the reaction proceeds according to Equation 1 or Equation 2 depends upon the magnitude of the reaction temperature. Above about 750° C., the chemical reaction proceeds as shown in Equation 1, while below about 750° C. the chemical reaction follows Equation 2. In borderline cases, i. e. at about 750° C., transitional situations are possible. It is preferred to operate in temperature ranges at which the reaction proceeds according to Equation 1. However, if the reaction should proceed according to Equation 2, the $SO_2$ gas which is formed and which is admixed only with steam, can be obtained in most pure and highly concentrated form by condensation and separation of the water vapor. The sulfuric acid is recovered by quantitative absorption in water or in dilute sulfuric acid.

It is entirely immaterial to the process of the invention whether ferric sulfate or ferrous sulfate is involved and what content of water of crystallization may be present, although the monohydrate is the most suitable.

The advantages of the present process reside essentially in the fact that the sulfuric acid, contained in bound form in the iron sulfate, is obtained directly, i. e. without having to pass through an intermediate stage of gaseous mixtures. The steam to be employed as supporter of the reaction is the only thing that needs to be produced. The iron oxide precipitates are substantially pure and can be employed in high grade subsequent operations which require pure iron oxide.

In carrying out the process of the present invention, for example, the iron sulfate is introduced into a closed, heatable chamber which has preliminarily been rendered air-free by passage of steam therethrough; the chamber is then heated to a temperature above 600° C., preferably above 750° C.; and the iron sulfate in the thus-heated chamber is then brought into contact with steam which is led into the chamber. The iron sulfate decomposes into free sulfuric acid and iron oxide. The thus-produced sulfuric acid is absorbed in a receiver with the aid of water or, preferably, dilute sulfuric acid. The iron oxide is mechanically removed. The process can be carried out continuously, the reduction of the iron oxide to metallic iron being directly added on as a second stage.

In a further development of the process according to the invention, oxygen-containing substances are added to the steam or to the iron sulfate. Thus, for example, hydrogen peroxide, nitrous acid, and particularly nitric acid or similar acting substances may be added to the steam, while barium peroxide, potassium chlorate or similarly acting substances may be incorporated with the iron sulfate. The particular oxidizing agent used will depend upon the requisite degree of purity of the resultant iron oxide. In general, nitric acid is the preferred oxidizing agent to be employed. In this case, at a reaction temperature of above 600° C., the following reaction takes place:

$$2FeSO_4 + H_2O + HNO_3 = Fe_2O_3 + 2H_2SO_4 + HNO_2$$

An important advantage of this embodiment of the process of the invention resides in the fact that, when it is employed, a closed circuit is established wherein—on the inlet side—iron sulfate, steam and nitric acid vapors are introduced, preferably simultaneously, and—on the outlet side—sulfuric acid and iron oxide are withdrawn, it being possible to recycle the steam together with regenerated nitric acid back to the inlet side.

The accompanying sheet of drawing sets forth, diagrammatically, an illustrative arrangement for carrying out the process of the invention, in connection with an exemplary embodiment of the invention wherein nitric acid is employed as oxidizing agent and is added to the steam.

In the reaction chamber 1, iron sulfate—introduced at 12—is reacted at elevated temperature, i. e. at a temperature above 600° C., with a mixture of steam and nitric acid vapors, produced at 2. There result, with partial reduction of the nitric acid ($HNO_3$) to nitrous acid ($HNO_2$) or the anhydride ($N_2O_3$) thereof, sulfuric acid and iron oxide. The thus-produced sulfuric acid is absorbed in receptacle 3 in hot water or hot aqueous sulfuric acid of increasing concentration. Since the hot vapors and gases flow directly from the reaction chamber into the said receptacle 3, the absorption liquid in the latter is brought to boiling in a very short time, whereupon water, nitric acid, nitrous acid and decomposition products thereof vaporize and only sulfuric acid remains behind. The upper limit of the temperature to be employed is determined by the boiling point of the sulfuric acid. In this way, a high grade sulfuric acid is obtained, which is free of nitrogen compounds. From receptacle 3, by way of conduit 13, the heated sulfuric acid can be withdrawn and led directly to the pickling bath or to the iron sulfate crystallization plant.

The gases and vapors escaping from receptacle 3 pass through the cooler 4 into the oxidation chamber 5. From the steam generator 2 and up to the inlet for the gases and vapors into the oxidation chamber 5, the apparatus is under superatmospheric pressure. In the subsequent parts of the apparatus, a subatmospheric pressure—produced by the suction pump 10—prevails. This serves for improved removal of the nitrous vapors, and for the sucking in at 14 of the incoming quantity of air which is necessary for the oxidation of the nitric oxide (NO) to nitrogen dioxide ($NO_2$). This oxidation is necessary because the anhydride of nitrous acid, $N_2O_3$, decomposes in part into NO and $NO_2$ and, in the absence of this expedient, the NO-fraction would be lost. To further the oxidation, the gases and vapors in receptacle 4 have to be carefully cooled. In this receptacle (4), there takes place the condensation of practically all the water vapor in addition to the major quantity of the unused and/or undecomposed nitric acid. These two fractions flow together into container 5, from which they go directly back to receptacle 2 by way of conduits 15, 16 or to the absorption towers 7, 8 and 9 by way of conduits 15, 19. This expedient constantly equalizes the water content of the system.

In order to elongate the oxidation path, which begins in receptacle 5, a further receptacle 6 is provided, which may be provided with an auxiliary cooler on its outlet side. The difficultly absorbable vapors pass from here into the absorption towers 7, 8 and 9 by way of conduit 20, being completely absorbed in the said towers. This expedient also equalizes at all times the nitric acid content of the system.

To complete the process, the iron oxide which is withdrawn at 17 and which is substantially sulfur-free, is passed into a reduction chamber 11 in which, by the action of reducing gases and especially of high CO-containing gases such as generator gases which are introduced at 18, it is reduced to metallic iron powder. This iron powder, because of its freedom from sulfur, is an excellent material for the production of sintered iron.

It will be understood that the applicability of the process of the invention is by no means restricted to the precedingly-described illustrative example. Thus, the nitric acid may be replaced by another of the precedingly described oxidizing agents for admixture with the steam, or the use of an oxidizing agent may be dispensed with entirely. Alternatively, the iron sulfate, which is supplied to the reaction chamber 1, may be admixed with a suitable oxidizing agent such as the previously mentioned barium peroxide, potassium chlorate or the like.

As hereinbefore indicated, the preferred temperature to which the reaction chamber is heated will be in excess of 750° C. A convenient temperature is, for example 800° C.

Having thus disclosed the invention, what is claimed is:

1. A process for the recovery of sulfuric acid and iron oxide from ferrous sulfate, which comprises passing steam through the ferrous sulfate at a temperature above 600° C. but not substantially in excess of about 800° C. in the absence of air and in the presence of an oxidizing agent selected from the group consisting of nitric acid, barium peroxide and potassium chlorate.

2. A process according to claim 1, wherein the oxidizing agent is barium peroxide.

3. A process according to claim 1, wherein the oxidizing agent is potassium chlorate.

4. A process for the recovery of sulfuric acid and iron oxide from ferrous sulfate, which comprises passing steam and nitric acid vapors through the ferrous sulfate at a temperature above 600° C. but not substantially in excess of about 800° C. in the absence of air.

5. A process according to claim 4, wherein the ferrous sulfate is obtained from waste iron pickling acid.

6. A process for the recovery of sulfuric acid and iron oxide from ferrous sulfate, which comprises passing steam and nitric acid vapors through the ferrous sulfate at a temperature above 600° C. but not substantially in excess of about 800° C. in the absence of air, whereby sulfuric acid and iron oxide are directly formed while the nitric acid is reduced to nitrous acid, separating the sulfuric acid from the excess of nitric acid and nitrous acid vapors, re-oxidizing the latter to nitric acid by the action of atmospheric oxygen, and recycling the nitric acid to the initial reaction stage.

References Cited in the file of this patent
UNITED STATES PATENTS

| | | |
|---|---|---|
| 1,348,462 | Weaver et al. | Aug. 3, 1920 |
| 1,489,347 | Davison | Apr. 8, 1924 |
| 1,813,649 | Weise | July 7, 1931 |